(No Model.)
I. N. CONDRA.
HAY STACKER.
No. 264,515. Patented Sept. 19, 1882.
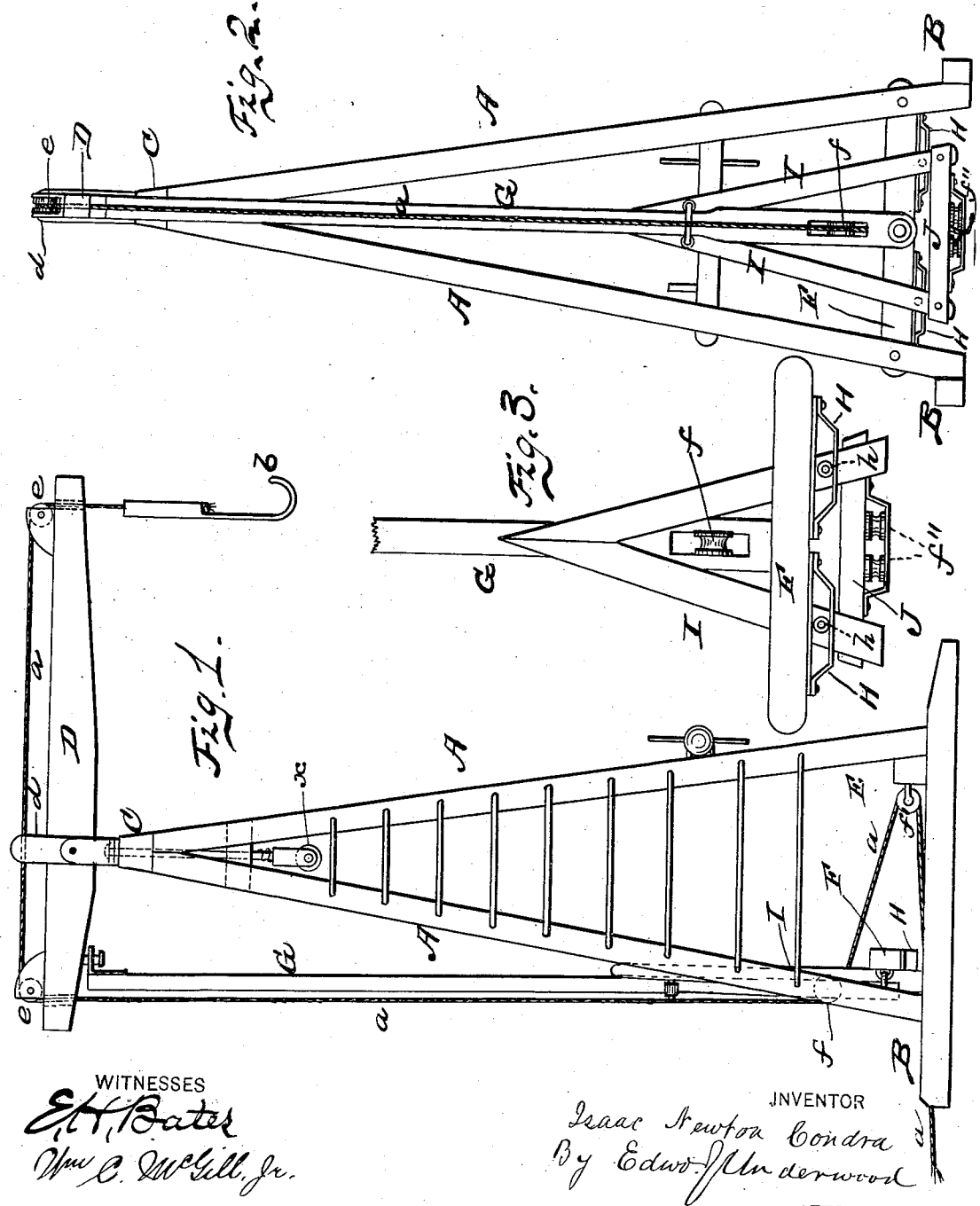
WITNESSES
E. H. Bates
Wm. C. McGill, Jr.
INVENTOR
Isaac Newton Condra
By Edwd. J. Underwood
ATTORNEYS

UNITED STATES PATENT OFFICE.

ISAAC N. CONDRA, OF SEYMOUR, IOWA.

HAY-STACKER.

SPECIFICATION forming part of Letters Patent No. 264,515, dated September 19, 1882.

Application filed July 11, 1882. (No model.)

*To all whom it may concern:*

Be it known that I, ISAAC NEWTON CONDRA, a citizen of the United States of America, residing at Seymour, in the county of Wayne and State of Iowa, have invented certain new and useful Improvements in Hay-Stackers, of which the following is a specification, reference being had therein to the accompanying drawings.

My invention relates to improvements in hay lifters and stackers; and it consists in a pivoted arm or cross-bar mounted on a pyramidal frame-work at an elevation sufficient to admit of raising hay or bundles of grain to the top of the highest stack or hay-mow, said arm carrying pulleys over which runs the rope attached to the elevating-fork, and having connected and being actuated by a tilting-lever to swing it from side to side; and it further consists in certain details of construction, to be hereinafter more fully shown, described, and claimed.

In the drawings, Figure 1 is a side elevation. Fig. 2 is a front elevation; and Fig. 3 is a detail view, showing the lever and swing-bar attachments.

A are the four uprights or frame-posts, which are securely attached at bottom to base-pieces B, on which the stacker rests, these uprights, which may be twenty feet high, or more, being arranged in the shape of a pyramid, which gives them solidity and steadiness of position. They meet at the top, where they are bolted together and surmounted by the metallic cap C, on which the arm D is pivoted. On the top of arm D, at each end, are pulleys $e$, and through openings in the ends of arm D runs the rope $a$, which carries the lifting-fork.

Attached to the arm D, on its top, is a loop, $d$, through which the lifting-rope passes, and by which the said rope is kept in place on the pulleys. Near the base of the upright standards A is the cross-piece E, and on the opposite side the tilting-bar F, to the latter of which is pivoted the lever G, its top being attached by an elbow to the rear end of arm D.

On the under side of the tilting-bar F are two elongated loops, H, in which move the roller attachments of the triangular frame or lever-brace I, through a staple in which passes the lower end of the tilting-lever G, and as the arm D is pivoted on the cap C of the framework, and the attachment of the lever to the arm made by a pivot, it follows that the arm D can be swung around from right to left, or the contrary, and deposit its load on either side or the middle of the stack. Near the lower end of the lever is an opening containing a pulley, $f$, over which passes the elevating-rope, and thence passing over a pulley, $f'$, on cross-piece E. It comes back between double pulleys $f''$ on the lever slide-bar J, which is the base of the triangular frame I. Now, it is obvious, since the frame or lever brace I plays through its attachments by the friction-rollers $h$ in the elongated loops H it will have a lateral swing or motion—that is, as the draft is applied to the rope $a$ the lateral strain on the rope at the same time that it elevates the load of hay on the fork will draw the lever slide-bar J in the direction of the draft and through the lever G swing the arm D to the side opposite the draft where it is desired to deposit the load. Thus, when a long rick is being made, the hay or straw can be deposited at any place along the length of the rick without changing the position of the stacker.

At the end of rope $a$ is the hook or fork $b$, which holds the load of hay while being elevated to the top of the stack or rick.

My stacker is very light, and can be handled or moved from place to place by two men. It does not require being staked down to the ground, as from its pyramidal shape it will stand securely where placed. When made of heavier material small wheels or rollers may be placed under the base-pieces B, by which it may be rolled from one position to another. It is adapted to be operated by horse-power; but in ordinary cases one man can elevate the load of hay by the rope and system of pulleys.

On one side of the uprights A is a series of cross-bars forming a ladder to reach the top of the stacker, serving also to hold the uprights together.

The operation is as follows: The hook or fork $b$ is attached to a sufficient quantity of hay or bundles of grain desired to be lifted from the ground or wagon to the top of the stack or barn, then, by a steady pull on the opposite end of the rope, the forkful of hay is raised to the desired elevation. When at the elevation required a lateral draft on the elevating-rope on one of the pulleys $f''$ draws the lever slide-bar J, by means of the friction-rollers $h$ in the loops H, to one side, and through the lever G swings the arm D into the position where the load is to be deposited.

A suspended pulley, $x$, within the framework A may be employed to raise heavy weights.

Having thus described my lifter and stacker, what I claim, and desire to secure by Letters Patent, is—

1. The combination of the pyramidal framework A A, surmounted by the metallic cap C, and the pivoted swing bar or arm D with the lever G, in manner and for the purpose specified.

2. The combination of the arm D, having the pulleys $e$ and loop $d$, with the lever G, carrying the pulley $f$, the lever-brace I, the lifting-rope $a$, and the lever swing-bar J, all as described and shown.

3. The pyramidal-shaped frame consisting of the uprights A, mounted on bases B, in combination with the tilting-bar F, provided with the loops H, the triangular lever-brace I, having the friction-rollers moving in the loops H, and by them attached to bar F, and the tilting-lever G, all as hereinbefore shown and specified.

In testimony whereof I affix my signature in presence of two witnesses.

ISAAC NEWTON CONDRA.

Witnesses:
J. R. BRADLEY,
JOHN J. MERRITT.